United States Patent [19]

Levin et al.

[11] Patent Number: 5,607,911
[45] Date of Patent: *Mar. 4, 1997

[54] AQUEOUS COMPOSITIONS WITH DETERGENT FOR RUST AND STAIN REMOVAL

[76] Inventors: Scott Levin; Eric Levin; Joseph Levin, all of 8533 Williams Ave., Philadelphia, Pa. 19150

[ * ] Notice: The term of this patent shall not extend beyond the expiration date of Pat. No. 5,525,252.

[21] Appl. No.: 635,630

[22] Filed: Apr. 22, 1996

Related U.S. Application Data

[63] Continuation-in-part of Ser. No. 373,055, Jan. 17, 1995, Pat. No. 5,525,252.

[51] Int. Cl.$^6$ .................................................. C02F 5/00
[52] U.S. Cl. ................... 510/253; 510/191; 510/238; 510/239; 510/240; 510/243; 510/244; 510/245; 510/246; 510/247; 510/254; 510/269; 510/419; 510/426; 510/495; 510/108; 510/109; 510/405; 510/434; 510/490; 510/242; 510/362; 510/363; 252/175
[58] Field of Search ..................... 252/80, 82, 85, 252/87, 136, 142, 173, 175; 510/191, 238, 239, 240, 243, 244, 245, 246, 247, 253, 254, 269, 419, 426, 109, 405, 434, 490, 495, 242, 108, 362, 363

[56] References Cited

U.S. PATENT DOCUMENTS

| | | | |
|---|---|---|---|
| 3,650,964 | 3/1972 | Sedliar | 510/383 |
| 4,032,466 | 6/1977 | Otrhalek et al. | 510/242 |
| 4,116,713 | 9/1978 | Otrhalek et al. | 134/3 |
| 4,283,300 | 8/1981 | Kurtz . | |
| 4,428,872 | 1/1984 | Callicott . | |
| 4,439,339 | 3/1984 | Doumit . | |
| 4,666,528 | 5/1987 | Arrington et al. | 134/2 |
| 4,787,984 | 11/1988 | Hutchings et al. | 210/698 |
| 4,828,743 | 5/1989 | Rahfield et al. | 510/363 |
| 4,851,149 | 7/1989 | Carandang | 510/253 |
| 5,215,676 | 6/1993 | Stone | 242/136 |
| 5,269,957 | 12/1993 | Ikeda et al. | 510/269 |
| 5,286,403 | 2/1994 | O'Dwyer et al. | 510/424 |
| 5,525,252 | 6/1996 | Levin et al. | 510/253 |

Primary Examiner—Alan D. Diamond
Attorney, Agent, or Firm—Frank A. Lukasik

[57] ABSTRACT

A biodegradable, acidic aqueous composition, with an anionic surfactant for the removal of rust, inorganic and organic deposits from a variety of surfaces. Said composition comprising Hydrochloric Acid, Phosphoric Acid, Tetrasodium EDTA, Anionic Surfactant, Perfume Oil, Dye and Water.

3 Claims, No Drawings

AQUEOUS COMPOSITIONS WITH DETERGENT FOR RUST AND STAIN REMOVAL

RELATED APPLICATION

This application is a Continuation-In-Part of application Ser. No. 08/373,055, Filed on Jan. 17, 1995 now U.S. Pat. No. 5,525,252.

BACKGROUND OF THE INVENTION

1. Field of the Invention

This invention relates to a chemical composition for the removal of calcium and mineral deposits from a variety of surfaces and more particularly to an aqueous chemical composition, with a low pH, comprising the mixtures of Hydrochloric Acid, Phosphoric Acid, Ethylenediamenetetraacetic Acid (EDTA), or the salts of EDTA, Anionic Surfactant, Perfume oil, Dye and Water. Adding EDTA, or the salts of EDTA, to the composition taught by the parent application, greatly enhances metal cleaning, acts as a detergent, or as a chelating agent.

2. Description of the Prior Art

One of the problems which the teachings of the present invention are intended to solve is that of the staining of the surfaces of porcelain water-receiving articles. In addition, the present composition will be useful for the removal of calcium and mineral deposits, scale, oil, slime, scum, and urinal salts, on a variety of surfaces including, concrete, tile, fiberglass, vinyl, porcelain, stucco, and including metals, iron, steel, and enameled coated metals.

Several prior art patents attempt to solve the above problems in different ways. For example, U.S. Pat. No. 4,787,984 to Hutchings et al discloses a cleaning composition comprising a water-dissipatable polyester polymer which is the reaction product of a difunctional acid, a difunctional sulfonometer, and a glycol. Hutchings et al also discusses the use of hydrochloric acid and a surfactant such as sodium dodecylbenzene sulfonate and a perfume.

U.S. Pat. No. 4,283,300 to Kurtz discloses a method and composition to inhibit staining of porcelain surfaces by manganese and was mentioned in the patent to Hutchings et al. Kurtz discloses the use of a stain inhibiting agent, dyes, perfumes, and disinfecting solutions.

U.S. Pat. No. 4,428,872 to Callicott discloses a composition to inhibit staining of porcelain surfaces by manganese. Callicott also discusses the use of sulfonic acid as a surfactant.

U.S. Pat. No. 4,439,339 to Doumit discloses a descaler composition and method of removing of scale from fresh water production equipment. The composition contains a blend of three acids of varying strengths, and including hydrochloric acid, dichloroacetic acid, and acetic acid. It also contains a surfactant such as isopropyl alcohol which provides surfactant properties and also reacts with the acids. The composition also includes an acid-base indicator such as methyl orange.

U.S. Pat. No. 4,666,528 to Arrington et al discloses a method of removing iron and copper-containing scale from a metal surface with a composition comprising an admixture of an aminocarboxylic acid, or the alkali metal salts or ammonium salts or amine salts and a phosphonic acid.

U.S. Pat. No. 5,215,676 to Stone discloses a chemical composition of a very low pH mixture of hydrochloric and phosphoric acids with organic ammonium and organic sulfate.

The broad concept of cleaning fluids comprising acids and surfactants is shown by the cited references. None of the references show or suggest the combination of the invention described below.

SUMMARY OF THE INVENTION

In accordance with the invention, there is provided an aqueous chemical composition, with a low pH, comprising the mixtures of Hydrochloric Acid, Phosphoric Acid, Ethylenediaminetetraacetic Acid, or the salts of EDTA, Anionic Surfactant, Perfume Oil, Dye and water. The composition, because of its surfactant Properties, (wetting agent and detergent), along with its blends of Hydrochloric Acid, Ethylenediaminetetraacetic Acid (EDTA), or the salts of EDTA, Phosphoric Acid, provides long lasting contact surface time on vertical and horizontal surfaces for the removal of calcium and mineral deposits, scale, rust, oil, slime, scum, and urinal salts, on a variety of surfaces including, plastic, concrete, tile, fiberglass, vinyl, stone, porcelain, stucco, and metals, iron, steel, and enameled coated metals.

Furthermore, because of the mixtures and blends of hydrochloric acid, ethylenediaminetetraacetic acid (EDTA) or the salts of EDTA, phosphoric acid, anionic surfactant, perfume oil, dye and water, the aqueous chemical composition contains no pungent odors, is relatively innocuous to organic materials, and can be used for indoor and outdoor use.

It is therefore an object of the invention to provide an improved aqueous composition, with a low pH, to provide for the removal of rust, mineral deposits and stains resulting from a variety of surfaces.

A further object of the invention is to use Ethylenediaminetetraacetic Acid (EDTA), or the salts of EDTA, as a detergent, metal cleaner, or as a chelating agent.

A still further object of the invention is to use an anionic surfactant which is environmentally safe, and biodegradable, stable in a solution with a low pH and serves as a wetting agent as well as a detergent.

Yet another object of the invention is to provide perfume oil to remove the pungent odors of the blended acids.

Still another object of the invention is to provide a dye to indicate the presence or absence of the solution on a surface to be cleaned.

DESCRIPTION OF THE PREFERRED EMBODIMENTS

The aqueous cleaning composition of the present invention comprises, on a weight basis by percentage (%), from about 1% to 15% wt., preferably from about 10% to 14.6% wt. of Hydrochloric Acid, from about 1% to 12% wt. of Phosphoric Acid, preferably from about 9% to 11% wt. of Phosphoric Acid, from about 0.25% to 5% wt. of Ethylenediaminetetraacetic Acid (EDTA), the salts which are called edetates, (calcium disodium, disodium edetates and/or tetrasodium, trisodium EDTA may be used, preferably from about 0.5% to 1.5% wt. of Ethylenediaminetetraacetic Acid (EDTA), the preferred EDTA is Tetrasodium EDTA, from about 1% to 10% wt. of Anionic Surfactant, preferably from about 2% to 3% wt. of an Anionic Acid, from about 0.05% to 3% wt. of Perfume Oil, preferably 1% to 2% wt. of Perfume Oil, and a Dye, less than 5% wt., preferably 0.25% to 1% wt. of dye, the balance with water.

EXAMPLE 1

Table I lists the compounds of the aqueous chemical solution in terms of percent (%) by weight, in one preferred embodiment of the present invention.

TABLE I

| | |
|---|---|
| Hydrochloric Acid | 10% wt. |
| Phosphoric Acid | 9% wt. |
| Tetrasodium EDTA | 0.5% wt. |
| 2-Dodecylbenzene Sulfonic Acid | 2% wt. |
| Perfume Oil | 1% wt. |
| Dye | 0.25% wt. |
| Water | Balance |

The present composition in Table I will be useful for the removal of calcium and mineral deposits, scale, oil, slime, scum, and urinal salts, on a variety of surfaces including, concrete, tile, fiberglass, vinyl, stone, porcelain, stucco, including metals, iron, steel, and enameled coated metals. Because of the mixtures and blends of Hydrochloric Acid, Phosphoric Acid, Tetrasodium EDTA, Anionic Surfactant, Perfume Oil, Dye and Water, the aqueous chemical composition contains no pungent odors, which makes it an advantage for indoor and outdoor use, and is relatively innocuous to organic materials.

The composition was tested by applying a small amount of the prepared aqueous solution onto a rust stain on a vertical stucco surface. The solution was allowed to penetrate the stained area for 2 minutes. After the solution was allowed to penetrate the rust stain for 2 minutes, the area was brushed and rinsed well with water. Upon close observation, the rust stained area was completely cleaned. In addition, it was observed that there were no pungent odors (Hydrochloric Acid fumes), as well as, no acid burns to the stucco surface and subsurfaces (pits and crannies), showing no signs of deterioration. It was also observed that the solution was clinging to the surface.

EXAMPLE 2

The Table I composition was then tested on a porcelain urinal that was stained with urinary salts. A small amount of the solution (100 ml) was poured onto the surface of the stain. The solution was then allowed to penetrate the stained area for 2 minutes. It was observed, that the aqueous chemical solution was clinging to the vertical surface of the porcelain stain. After the solution was allowed to penetrate the stain for 2 minutes, the area was brushed and rinsed with water. Upon close observation, the stained area was quite clean, no signs of the urinary salts on the porcelain surface. In addition, it was observed that there were no pungent odors (Hydrochloric Acid fumes), as well as, no acid burns to the porcelain surface. The porcelain surface was smooth to the touch, the chemical composition did not deteriorate the porcelain surface.

EXAMPLE 3

The table I composition was then tested on a ceramic tile, that had a calcium deposit stain. A small amount of the prepared solution (100 ml) was poured onto the stain. The solution was allowed to penetrate the stain for 1–3 minutes. The calcium deposit stain was brushed and rinsed well. Upon close observation, the calcium stained area was quite clean. Also, it was observed that there were no pungent odors (Hydrochloric Acid fumes), as well as, no Acid burns to the ceramic tile. The ceramic tile was smooth to the touch and the composition did not deteriorate the ceramic surface.

EXAMPLE 4

The table I composition was then tested on a steel screwdriver, iron hammerhead, and steel drill bits that had rust stains on them. Each item was placed into a glass beaker that contained (150 ml) of the aqueous solution, and the items were allowed to soak for 1–3 minutes. The items were brushed, rinsed well and then wiped dry. Upon close observation, about 50–60% of the rust stains were removed from the items. Also, it was observed that there were no pungent odors, (Hydrochloric Acid fumes), as well as, no acid burns to the metal surfaces, no pitting or discoloration to the metal surfaces, as each item was smooth to the touch. The conclusion to the tests was that the results were unsatisfactory because of the amount of rust still remaining on the surface of each metal item.

EXAMPLE 5

The Table I composition was then tested on a vinyl liner surface that contained a variety of grease, grime, and oil stains. A small amount of the prepared aqueous solution, (100 ml) was poured onto the different stains of the vinyl liner surface. The solution was allowed to penetrate the stains for 1–2 minutes. After the solution was allowed to penetrate the different stains on the vinyl surface, the stained area was brushed and rinsed well with water. Upon close observation, the stained area was quite clean. In addition, it was observed that there were no pungent odors, (Hydrochloric Acid fumes), as well as, no acid burns to the vinyl liner surface. The aqueous composition did not deteriorate the vinyl liner surface, as it was smooth to the touch.

EXAMPLE 6

The Table I composition was then tested by applying a small amount, (100 ml) of the prepared aqueous chemical solution onto a rust stained enameled steel surface. The solution was allowed to penetrate the stained area for 1 minute. The rust stained area was then brushed and rinsed well. Upon close observation, the stained area was quite clean. Furthermore, it was observed that there were no pungent odors, (Hydrochloric Acid Fumes), as well as, no acid burns to the enameled steel surface. The enameled steel surface was smooth to the touch, and the composition did not deteriorate the enameled steel surface.

EXAMPLE 7

Table II lists the compounds of the aqueous chemical solution in terms of percent (%) by weight, in one preferred embodiment of the present invention:

TABLE II

| | |
|---|---|
| Hydrochloric Acid | 14.6% wt. |
| Phosphoric Acid | 11.0% wt. |
| Tetrasodium EDTA | 1.5% wt. |
| 2-Dodecylbenzene Sulfonic Acid | 3.0% wt. |
| Perfume Oil | 2.0% wt. |
| Dye | 1.0% wt. |
| Water | Balance |

The present composition in Table II will be useful for the removal of Calcium and Mineral deposits, scale, oil, slime, scum, and urinal salts, on a variety of surfaces including, concrete, tile, fiberglass, vinyl, stone, porcelain, stucco, including metals, iron, steel, and enameled coated metals. Because of the mixtures and blends of Hydrochloric Acid, Phosphoric Acid, Tetrasodium EDTA, Anionic Surfactant, Perfume Oil, Dye, and Water, the aqueous chemical composition contains no pungent odors, which makes it advantageous for indoor and outdoor use, and is relatively innocuous to organic materials.

The Table II composition was then tested on a vertical concrete surface that contained an iron and rust stain. A small amount of the solution (100 ml), was allowed to penetrate the stain for 1 minute. The iron and rust stain was brushed and rinsed well. Upon close observation, the iron and rust stained area was quite clean. It was also observed, that the chemical composition was adhered to the vertical surface, long lasting contact surface time. Also, it was observed that there were no pungent odors, (Hydrochloric Acid fumes), as well as, no acid burns to the concrete. The concrete surface showed no signs of deterioration.

EXAMPLE 8

The Table II composition was then tested by applying a small amount of the prepared aqueous solution (100 ml) onto a rust stained enameled coated steel surface. The solution was then allowed to penetrate the stained area for 30 seconds to 1 minute. The rust stained area was then brushed and rinsed well. Upon close observation, the stained area was quite clean. Also, it was observed that there were no pungent odors, (hydrochloric Acid fumes), as well as, no acid burns to the enameled coated steel surface. The surface was smooth to the touch, and the composition did not deteriorate the enamel surface.

EXAMPLE 9

The Table II composition was then tested on a steel screwdriver, an iron hammerhead, and steel drill bits, that had rust stains on them. Each item was placed into a glass beaker that contained (100 ml) of the aqueous solution and the items were allowed to soak for 30 seconds to 1 minute. The items were brushed, rinsed well and then wiped dry. Upon close observation, the stains on each item, the steel screwdriver, iron hammerhead, and steel drill bits, were clean of the rust stains. Furthermore, it was observed that there were no pungent odors (Hydrochloric Acid Fumes), as well as, no acid burns to the steel and iron surfaces of each item. There was no pitting, or discoloration of the surface to each metal surface, as each item was smooth to the touch.

EXAMPLE 10

The Table II composition was then tested on a fiberglass surface that contained a rust stain. A small amount of the prepared composition (100 ml) was then poured onto the surface of the stain. The solution was allowed to penetrate the stain for 1–3 minutes. The rust stained area was then brushed and rinsed well. Upon close observation, the stained area was clean. Furthermore, it was also observed that there were no pungent odors (Hydrochloric Acid fumes), as well as, no acid burns to the fiberglass surface. The fiberglass surface was smooth to the touch, and the composition did not deteriorate the fiberglass surface.

EXAMPLE 11

The Table II composition was then tested on a rubberized surface, that contained grease and oil stains that stained the surface of the material. A small amount (100 ml), of the prepared solution was allowed to penetrate the stain for 30 seconds to 1 minute. The grease and oil stains were then brushed and rinsed well. Upon close observation, the stained area was cleaned. In addition, it was observed that there were no pungent odors (Hydrochloric Acid fumes), as well as, no acid burns to the rubberized surface. The rubber surface was smooth to the touch as there was no deterioration of the rubberized surface.

EXAMPLE 12

The Table II composition was then tested on a cloth fabric that was 100% cotton, that contained a mineral deposit stain that penetrated the cotton cloth fabric. The prepared solution (25 ml) was then poured onto the stain and allowed to penetrate the stained cotton cloth fabric for 10–30 seconds. The stained cloth fabric was then brushed and rinsed very well with water. Upon close observation, the rust stained area was clean. Furthermore, it was also observed that there were no pungent odors (Hydrochloric Acid Fumes), as well as, no acid burns to the cotton cloth fabric. The cloth fabric was smooth to the touch, and there was no deterioration to the cotton fabric.

In summation, the instant invention is a chemical composition that contains a low pH, for the removal of rust and stains from a variety of surfaces (i.e., concrete, fiberglass, etc.), including metals, (iron, steel, enameled coated metals). The aqueous composition is relatively innocuous to organic materials. In addition, there are no deadly acid fumes from hydrochloric acid which is an advantage for indoor and outdoor use. The use of an Anionic Surfactant for long lasting contact surface time for horizontal and vertical surfaces, (wetting agent), as well as, the use of the Anionic Surfactant as a detergent. Also the use of Ethylenediaminetetraacetic Acid (EDTA), or the salts of EDTA as a detergent, metal cleaner, or as a chelating agent, the preferred EDTA in this aqueous cleaning composition being Tetrasodium EDTA.

The invention may be embodied in other specific forms without departing from the spirit or essential characteristics. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A foaming acidic composition of an aqueous solution of the following compounds, ranging within the stated amounts in terms of percent by weight, for the removal of calcium and mineral deposits from a variety of surfaces, said composition consisting of:

| | |
|---|---|
| Hydrochloric Acid | 1% to 15% |
| Phosphoric Acid | 1% to 12% |
| Tetrasodium Ethylenediaminetetraacetic acid | 0.25% to 5% |
| Anionic Surfactant | 1% to 10% |
| Perfume Oil | 0.53% to 3% |
| Dye | less than 5% |
| Water | Balance. |

2. An acidic cleaning composition of the following compounds, ranging within the stated amounts in terms of percent by weight, for the removal of calcium and mineral deposits from a variety of surfaces, said composition consisting of:

| | |
|---|---|
| Hydrochloric Acid | 10% to 14.6% |
| Phosphoric Acid | 9% to 11% |
| Tetrasodium Ethylenediaminetetraacetic acid | 0.5% to 1.5% |
| Anionic Surfactant | 2% to 3% |
| Perfume Oil | 1% to 2% |
| Dye | 0.25% to 1% |
| Water | Balance. |

3. The composition of claim 2 wherein said Anionic Surfactant consists of 2-Dodecylbenzene Sulfonic Acid.

* * * * *